United States Patent
Powell, Jr.

(10) Patent No.: US 11,946,509 B2
(45) Date of Patent: Apr. 2, 2024

(54) WHEEL HUB TO AXLE FASTENING ARRANGEMENT

(71) Applicant: Johnny F Powell, Jr., Aberdeen Proving Grd, MD (US)

(72) Inventor: Johnny F Powell, Jr., Aberdeen Proving Grd, MD (US)

( * ) Notice: Subject to any disclaimer, the term of this patent is extended or adjusted under 35 U.S.C. 154(b) by 58 days.

(21) Appl. No.: 17/194,172

(22) Filed: Mar. 5, 2021

(65) Prior Publication Data
US 2021/0388869 A1    Dec. 16, 2021

Related U.S. Application Data

(60) Provisional application No. 62/985,873, filed on Mar. 5, 2020.

(51) Int. Cl.
*F16C 35/08*    (2006.01)

(52) U.S. Cl.
CPC .......... *F16C 35/08* (2013.01); *F16C 2326/02* (2013.01)

(58) Field of Classification Search
CPC ........ B60B 7/0013; B60B 27/02; F16C 35/08
See application file for complete search history.

(56) References Cited

U.S. PATENT DOCUMENTS

| | | | | | |
|---|---|---|---|---|---|
| 1,979,895 | A | * | 11/1934 | Maker | B60B 7/0013 301/37.38 |
| 3,064,982 | A | * | 11/1962 | Stephens | B60B 27/0073 384/485 |
| 3,395,950 | A | * | 8/1968 | Brandt | B60B 7/002 277/565 |
| 3,642,327 | A | * | 2/1972 | Walther | B60B 7/002 301/108.1 |
| 6,224,167 | B1 | * | 5/2001 | Riley | F16C 25/06 301/126 |
| 9,327,552 | B2 | * | 5/2016 | Ono | F16C 33/6622 |
| 2007/0052287 | A1 | * | 3/2007 | White | F16C 25/06 301/132 |
| 2021/0101406 | A1 | * | 4/2021 | Reshad | B60B 7/0013 |

* cited by examiner

*Primary Examiner* — Jason R Bellinger
(74) *Attorney, Agent, or Firm* — Obi Iloputaife, Esq.

(57) ABSTRACT

The wheel hub fastener has a planar body formed of a sheet of resilient metal or material having a selected thickness between top and bottom surfaces to allow sufficient engagement of the axle spindle thread with which it is to be used and the compression washer, castle-nut, and cotter pin. The bolt circle pattern of smaller holes allows ample grease to the bearing assembly, should a greasing device be used. The outer diameter, inner diameter as well as the bolt circle diameter and placement, will vary depending upon the diameter of the respective spindles and races for the various bearing sizes.

4 Claims, 1 Drawing Sheet

WHEEL HUB TO AXLE FASTENING ARRANGEMENT

CROSS-REFERENCE TO RELATED APPLICATIONS

The present application claims the benefit of U.S. Provisional Application Ser. No. 62/985,873, filed on Mar. 6, 2020, specification of which is herein incorporated by reference for completeness of disclosure.

BACKGROUND OF THE INVENTION

Wheel/hub assemblies can come off when a bearing fails on any type of towable, such as trailers, campers, etc. Consequently, this poses serious safety hazards on the road and damage to property and equipment.

SUMMARY OF THE INVENTION

This invention will positively retain a wheel/hub from coming off should you have a bearing failure, while also allowing for grease to the bearings. This invention is also reusable.

DETAILED DESCRIPTION OF THE DRAWINGS

Figure 2:
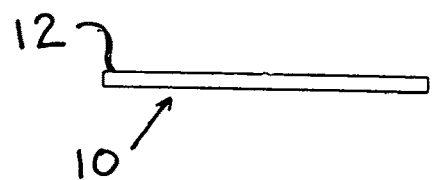
FIG. 2 is a side view of the wheel hub fastener.

Referring to the Figures, the wheel hub fastener 10 includes a ring like body generally designated 12, formed from a thin sheet of resilient, metallic, or other material having a selected thickness. For example, carbon steel sheet having a thickness of 0.3125" may be employed. As best seen in FIG. 2, the body 12 is planar. The holes 16 are radially outward from the central aperture 14.

Figure 1:
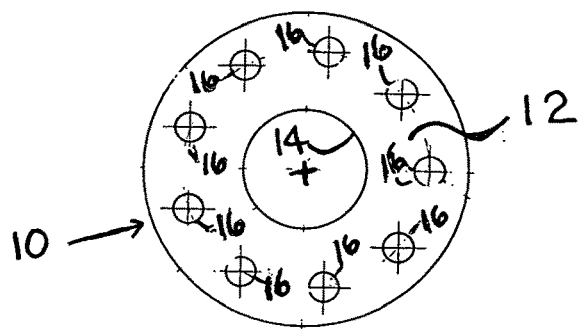
FIG. 1 is a plan view of one embodiment of the wheel hub fastener made according to the invention.
Figure 3:
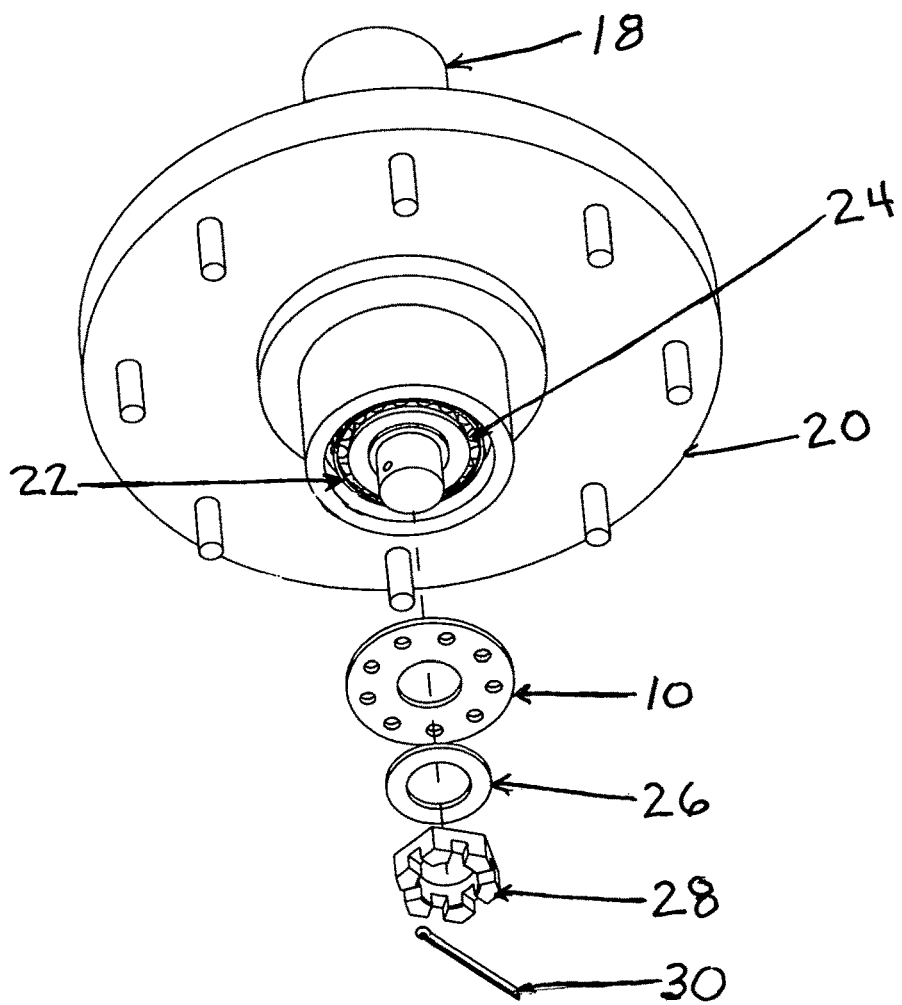
FIG. 3 is an exploded view of the wheel hub fastener of FIGS 1 and 2 and the order in which it would be installed in relation to the other parts in a typical wheel/hub assembly.

FIG. 1 the body 12 includes a central aperture 14 which is generally circular with a diameter which is just slightly greater than the diameter of the shank of the spindle 18 whose castle nut 28 is to be locked with 30 cotter-pin FIG. 3 the holes 16 may be advantageously provided in the wheel hub fastener 10 to facilitate and allow grease to the bearings 24 should a spring-loaded greasing device be used for that purpose but are not necessarily needed if such a device is not used.

FIG. 3 this view best shows the order of the parts and of their placement; the spindle 18 with the hub 20, the race 22 with the bearing 24, wheel hub fastener 10, compression washer 26, castle-nut 28, and cotter-pin 30.

Still other aspects, objects, and advantages of the present invention can be obtained from a study of the specification, the drawings, and the appended claims. It should be understood, however that the present invention could be used in alternate forms where less than all the objects and advantages of the present invention and preferred embodiment as described above would be obtained.

What is claimed is:

1. A wheel hub fastener apparatus to prevent a wheel hub assembly separation from an axle spindle due to a bearing failure comprising:
   a planar body formed of a sheet of resilient material having a selected thickness between top and bottom surfaces for engagement with an axle spindle of a wheel hub assembly, wherein said planar body is couplable to said wheel hub assembly using a compression washer, a castle-nut and a cotter pin; a central aperture at a geometric center of said planar body configured to fit said axle spindle; and a plurality of holes located radially from said central aperture, wherein said plurality of holes is configured for providing grease to a bearing assembly of said wheel hub assembly with an external greasing device.

2. The wheel hub fastener of claim 1, wherein said resilient material is metal.

3. The wheel hub fastener of claim 1, wherein said thickness is 0.3125 inches.

4. A wheel hub fastener apparatus to prevent a wheel hub assembly separation from an axle spindle due to a bearing failure comprising:
   a circular planar disc formed of a sheet of resilient material having a selected thickness between top and bottom surfaces for engagement with an axle spindle of a wheel hub assembly, wherein said circular planar disc is couplable to said wheel hub assembly using a compression washer, a castle-nut and a cotter pin;
   a central aperture at a geometric center of said circular planar disc configured to fit said axle spindle; and
   a plurality of holes located radially from said central aperture, wherein said plurality of holes is configured for providing grease to a bearing assembly of said wheel hub assembly when using an external greasing device.

* * * * *